July 1, 1958 — T. W. CARRAWAY — 2,841,369
EVAPORATIVE CONDENSER APPARATUS AND
LIQUID DISPERSER UNIT THEREFOR
Filed Aug. 17, 1953 — 8 Sheets-Sheet 2

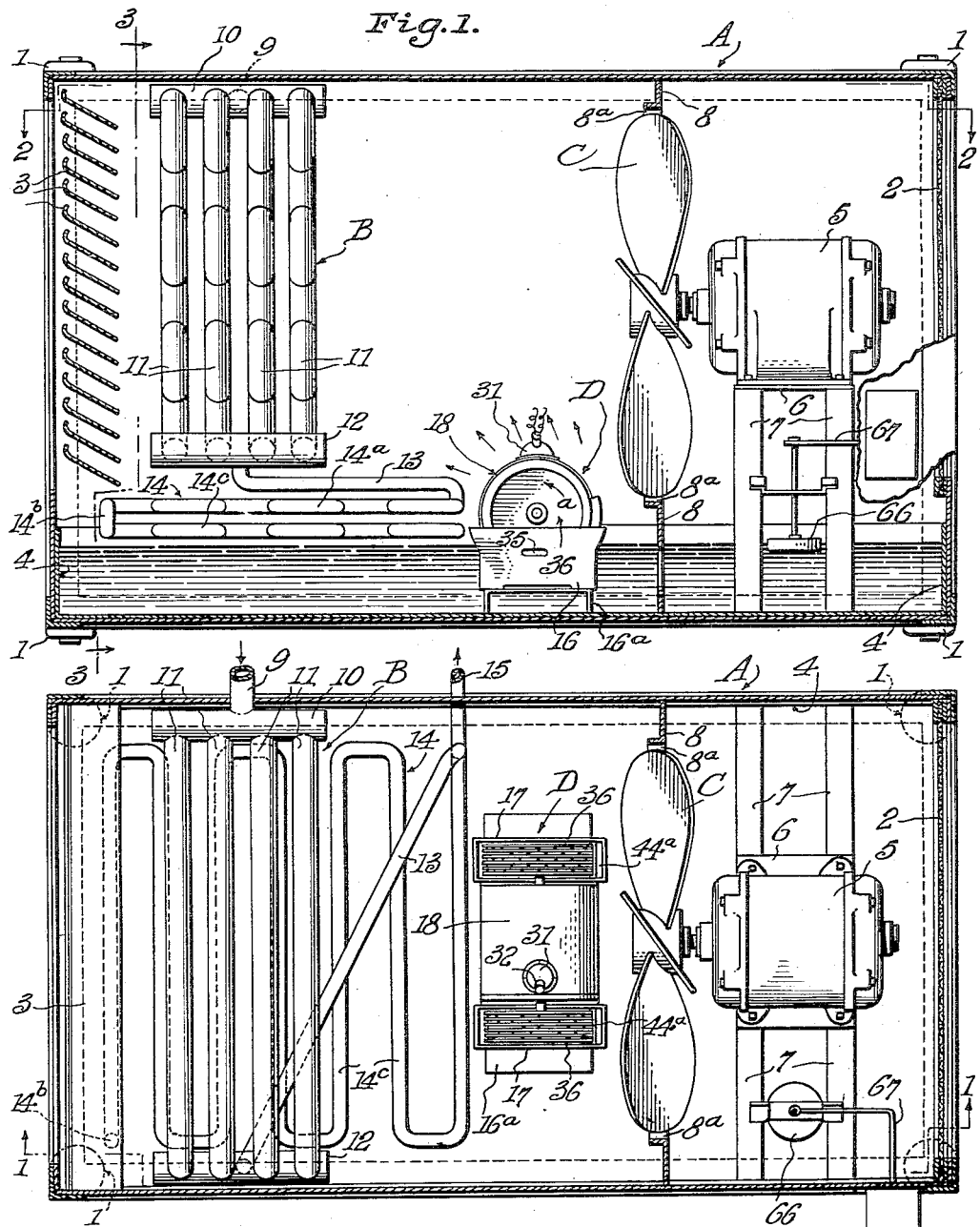

Inventor
Thomas W. Carraway
By Baldwin, Wight, & Prevost
his ATTORNEYS

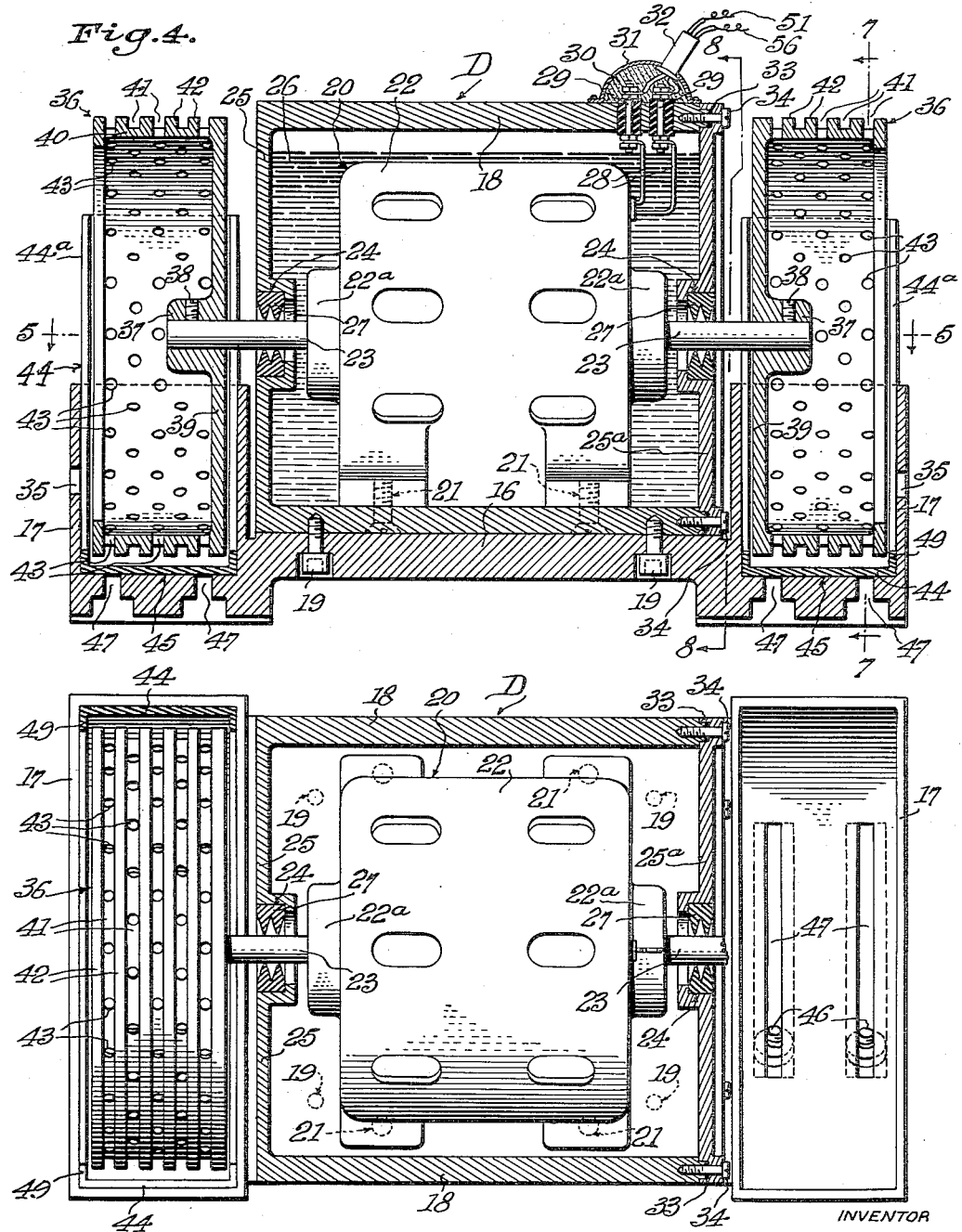

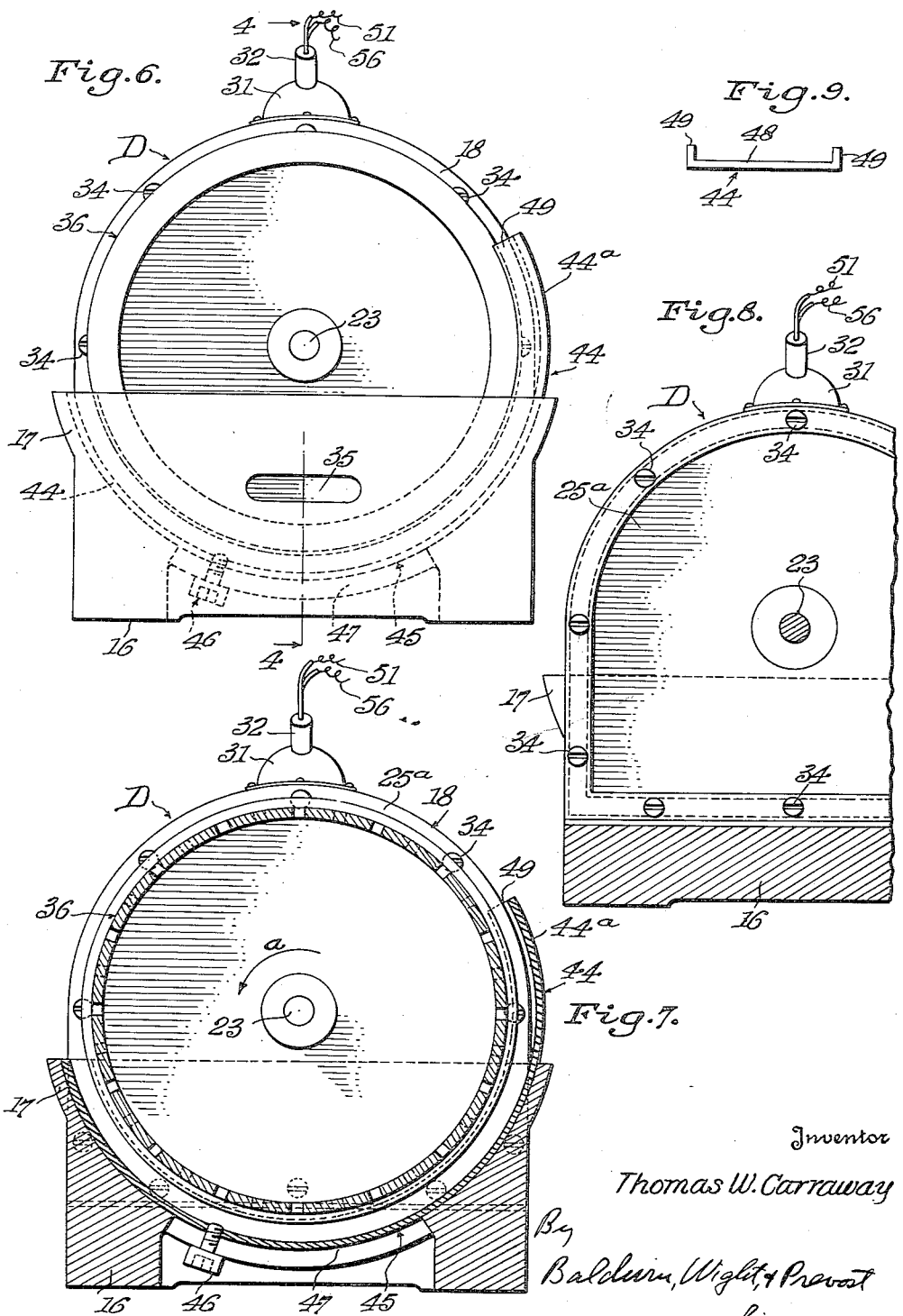

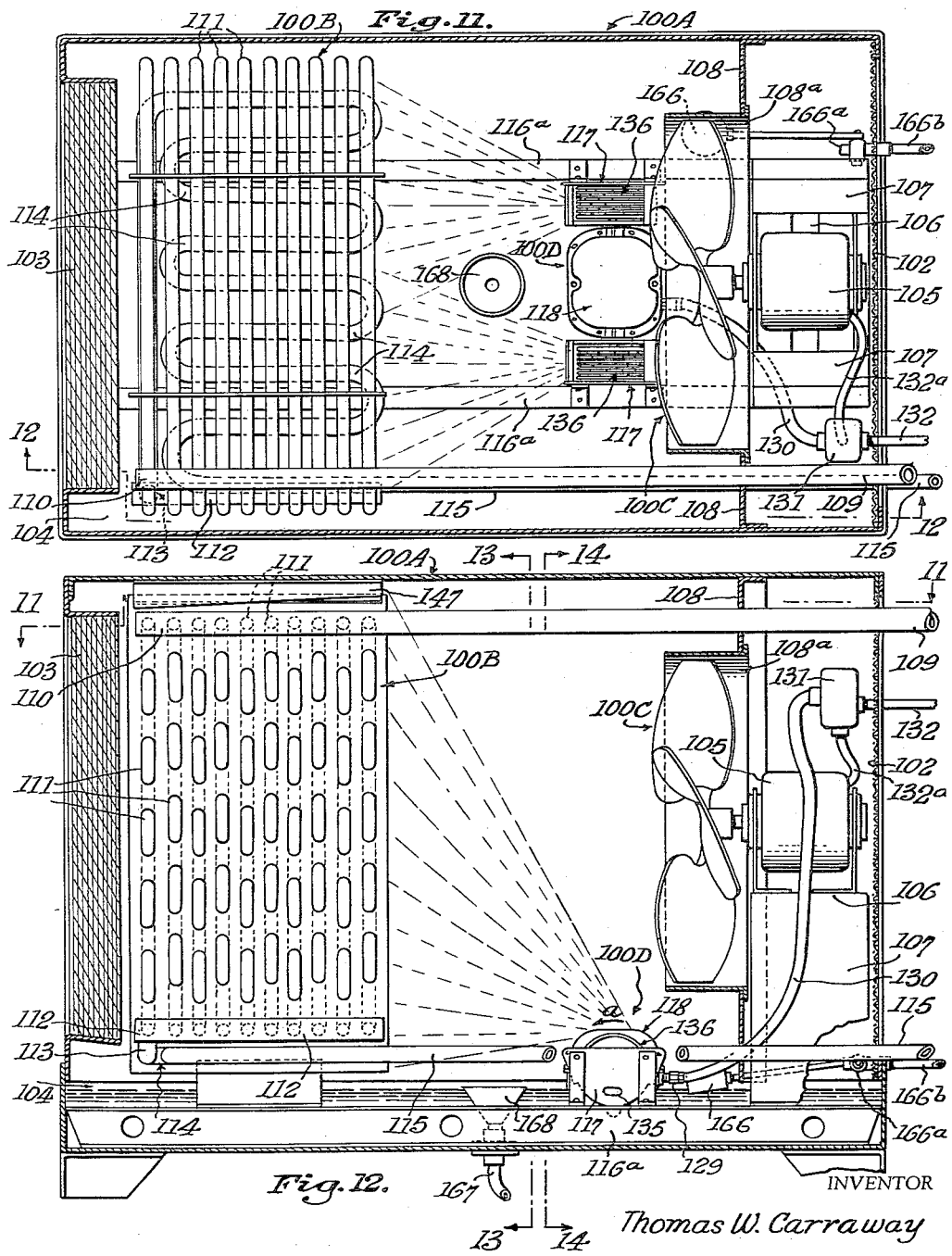

July 1, 1958
T. W. CARRAWAY
2,841,369
EVAPORATIVE CONDENSER APPARATUS AND
LIQUID DISPERSER UNIT THEREFOR
Filed Aug. 17, 1953
8 Sheets-Sheet 6
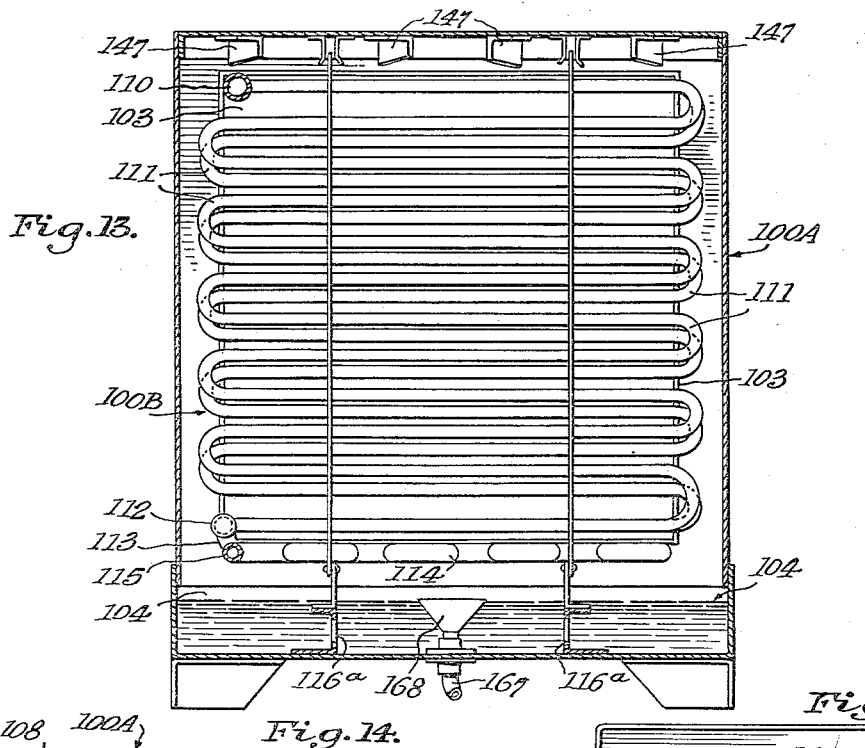
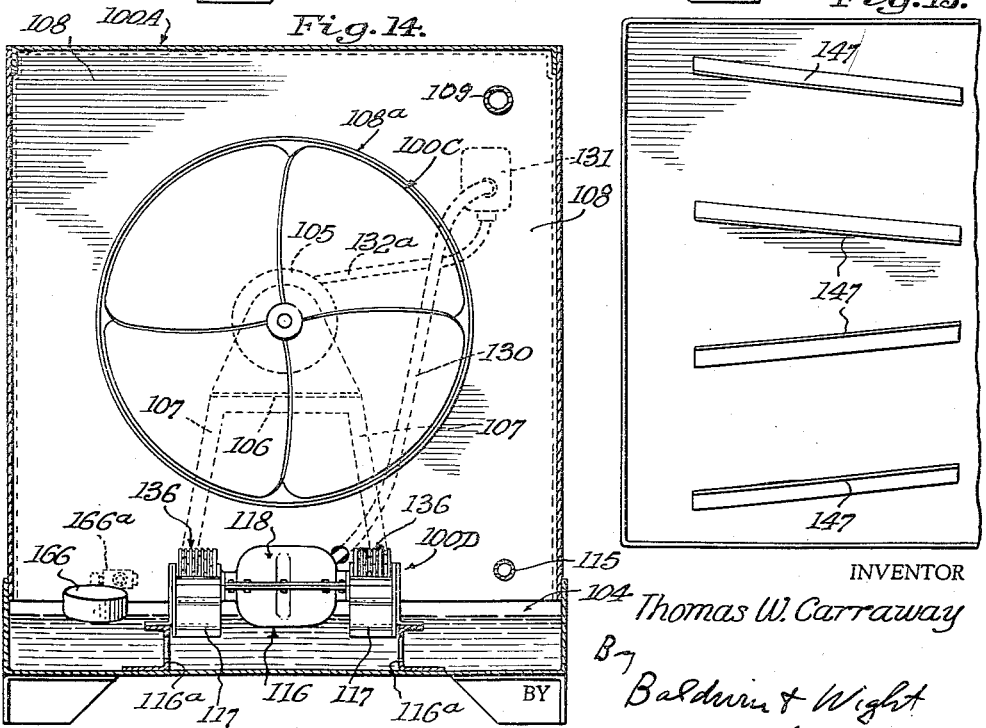
INVENTOR
Thomas W. Carraway
BY
Baldwin & Wight
his ATTORNEYS

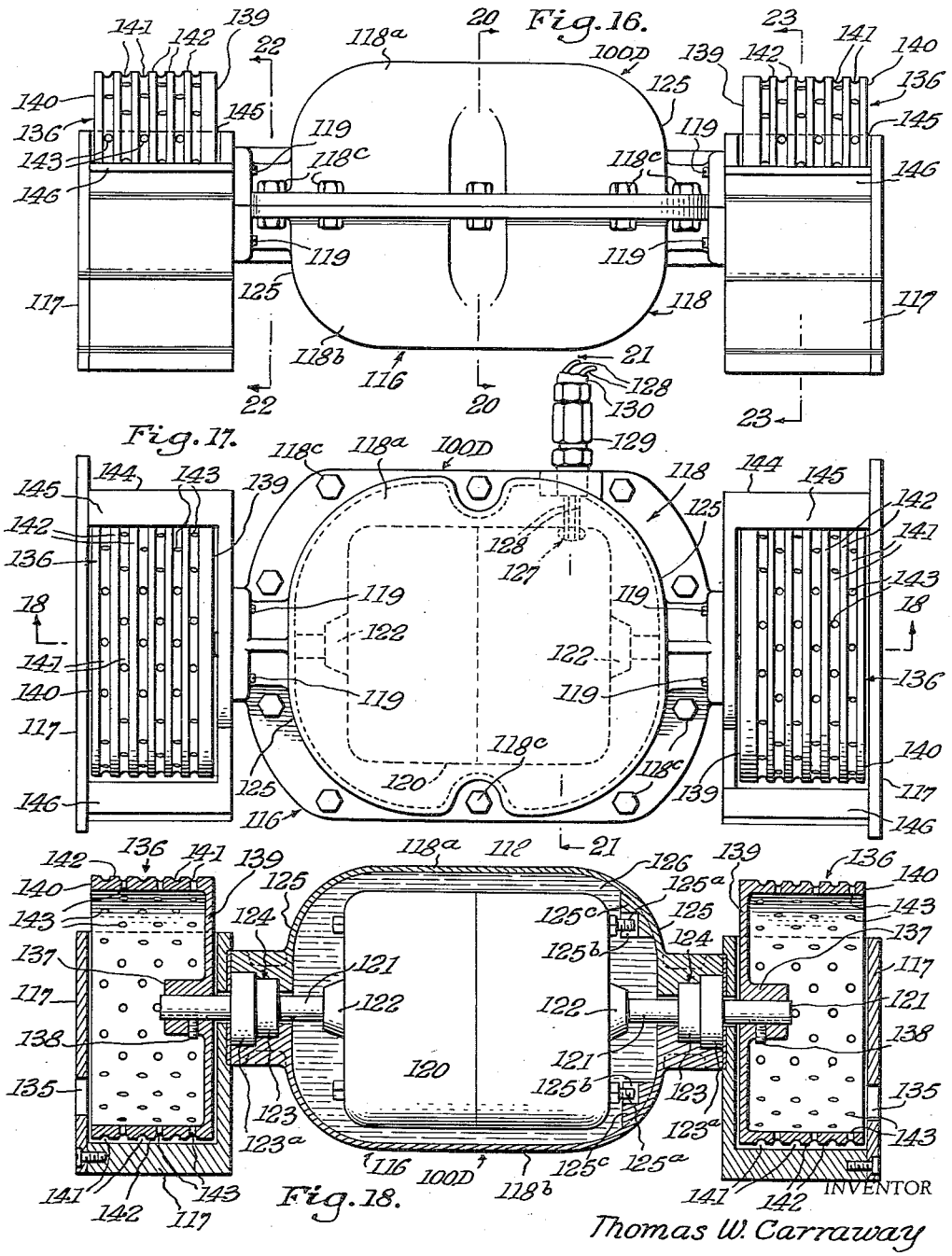

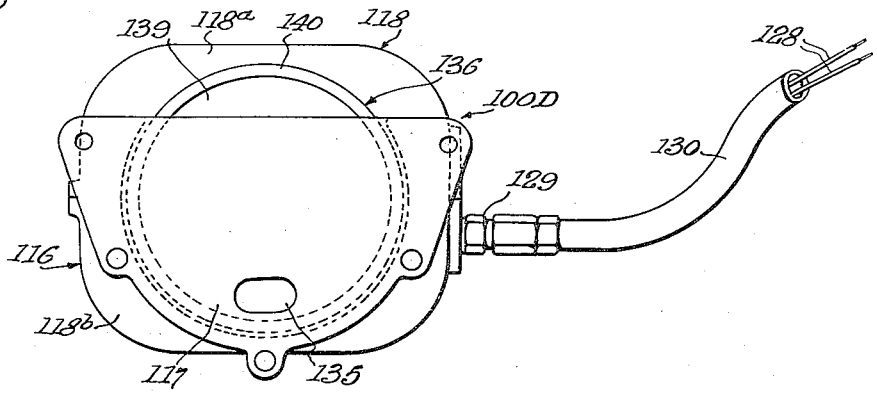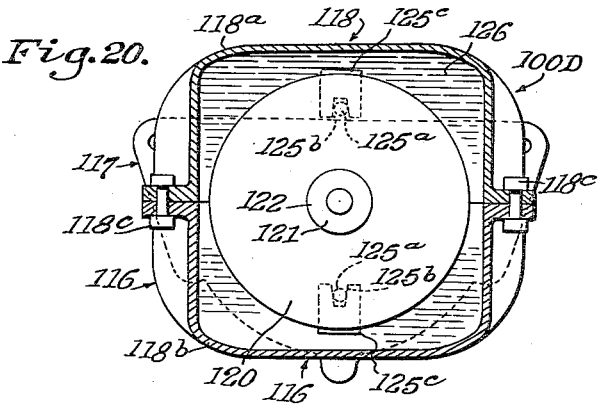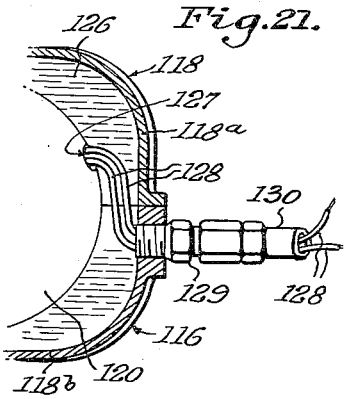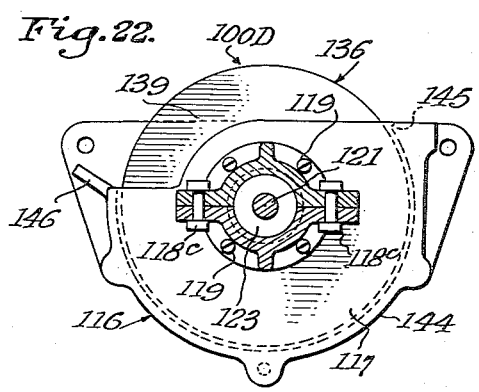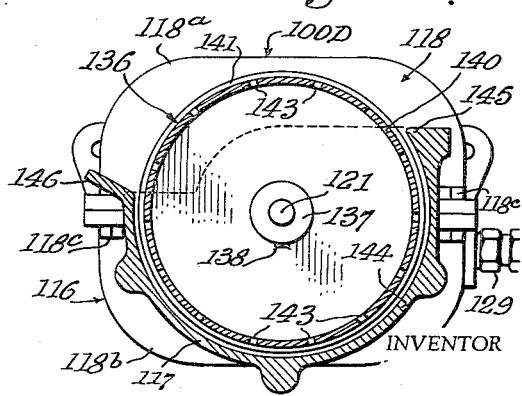

United States Patent Office 2,841,369
Patented July 1, 1958

2,841,369

EVAPORATIVE CONDENSER APPARATUS AND LIQUID DISPERSER UNIT THEREFOR

Thomas W. Carraway, Dallas, Tex.

Application August 17, 1953, Serial No. 374,565

4 Claims. (Cl. 257—37)

This invention relates to evaporative condenser apparatus, and to liquid disperser units especially suited for use in connection with such apparatus.

This application is a continuation-in-part of my copending application Serial No. 72,406, filed January 24, 1949, and now abandoned.

Evaporative condensers have gained favor since their introduction in the heat exchange field some time ago. The general construction and mode of operation of conventional apparatus of this kind are well known. Usually, a blower is arranged to cause an air stream to flow over a condenser coil unit through which the gas to be cooled is passed, and evaporative liquid, e. g. water, is introduced into the air stream, and sometimes is deposited upon the coil unit so as to extract from the air and from the coil unit the heat required to evaporate the liquid. Such equipment has the advantage of eliminating the substantial expense of providing a source of cool water which is wasted after use in condensing, or a cooling pond or tower for cooling the condensing water when the latter is recirculated.

The efficiency and economy of operation of evaporative condensers of the class to which the present invention relates depend largely upon the effectiveness with which the evaporative liquid is dispersed or diffused in the air stream. In the past, the dispersion or diffusion has been accomplished as well as possible, by then known methods and equipment, most commonly by spraying the liquid from nozzles. This has resulted in practical difficulties, principally the necessity for servicing the nozzles frequently to remove stoppages, or scale encrustation or deposits. This is objectionable not only because of the servicing costs involved, but also because of the inconvenience and other obvious disadvantages of placing the equipment out of operation for servicing.

An object of the present invention is to provide evaporative condenser apparatus including a novel unit comprising an air moving means, a heat exchanger, and an evaporative liquid disperser means so constructed and arranged as to eliminate the outstanding difficulties heretofore encountered in the use of known evaporative condenser apparatus.

Another object of the invention is to provide evaporative condenser apparatus of the kind referred to in which the liquid disperser means is of novel and improved construction and is capable of operating continuously, without service shut-downs, for producing a well dispersed or diffused mass of liquid in the air stream, and depositing a thin film of liquid on the heat exchanger coils.

Another object of the invention is to provide such evaporative condenser apparatus in which the liquid disperser means is so constructed and arranged with respect to a heat exchanger coil or other unit as to direct successive but merging phases of dispersed liquid onto the unit in a graduated distribution varying from a dispersion of relatively large drops which impinge on the upper part of the unit to a finely divided fog or mist which is caused to envelop the lower part of the unit, whereby substantially the entire heat exchanger unit will be maintained wet, and liquid from the drops impinging on the upper part of the unit will run down over and thereby will wash the surfaces of the unit from top to bottom.

Another object of the invention is to provide a liquid disperser unit of novel and improved construction including rotatable impellers for producing the graduated distribution referred to.

Another object of the invention is to provide an improved liquid disperser unit comprising rotatable impellers of novel construction, and deflectors associated with the impellers for controlling or determining the zone in which the diffusion of liquid is produced.

A further object of the invention is to provide a disperser unit of the character referred to including an improved arrangement for insulating and cooling a driving motor for the disperser element or elements.

Other objects of the invention will become apparent from a reading of the following description, the appended claims, and the accompanying drawings.

Figures 1 to 10 inclusive show one embodiment of the invention, and in these figures:

Figure 1 is a vertical, longitudinal sectional view of apparatus embodying the invention, on the line 1—1 of Figure 2;

Figure 2 is a horizontal sectional view on the line 2—2 of Figure 1;

Figure 4 is a detail, vertical sectional view of liquid dispersing apparatus constructed in accordance with the invention, drawn on an enlarged scale;

Figure 5 is a horizontal sectional view on the line 5—5 of Figure 4, one impeller disk and deflector being omitted;

Figure 6 is an end elevation showing the dispersing apparatus as viewed from the right of Figure 4;

Figure 7 is a vertical sectional view on the line 7—7 of Figure 4;

Figure 8 is a fragmentary vertical sectional view on the line 8—8 of Figure 4;

Figure 9 is a detail end elevational view of a liquid deflector; and

Figure 3:
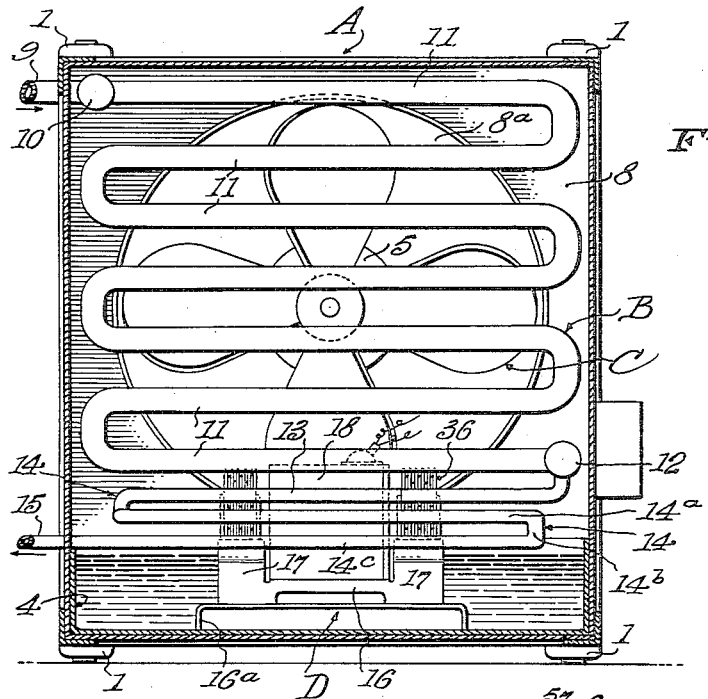
Figure 3 is a transverse vertical sectional view on the line 3—3 of Figure 1.

Figures 11 to 23 inclusive show another embodiment of the invention, and in these figures:

Figure 11 is a horizontal, longitudinal sectional view of a second form of apparatus embodying the invention on the line 11—11 of Figure 12, some parts being shown in plan;

Figure 12 is a vertical sectional view on the line 12—12 of Figure 11, some parts being shown in elevation;

Figure 13 is a transverse vertical sectional view on the line 13—13 of Figure 12, certain parts being shown in elevation;

Figure 14 is a vertical sectional view on the line 14—14 of Figure 12; certain parts being shown in elevation;

Figure 15 is a fragmentary bottom plan view of the underside of the top wall of an air duct or casing;

Figure 16 is an elevational view of a liquid disperser unit included in the apparatus illustrated in Figures 11 to 23 inclusive;

Figure 17 is a top plan view of the disperser unit shown in Figure 16;

Figure 18 is a vertical sectional view on the line 18—18 of Figure 17;

Figure 19 is an end elevational view of the disperser unit shown in Figures 16, 17 and 18;

Figure 20 is a transverse vertical sectional view on the line 20—20 of Figure 16;

Figure 21 is a fragmentary vertical sectional view on the line 21—21 of Figure 17;

Figure 22 is a vertical section on the line 22—22 of Figure 16; and

Figure 23 is a vertical section on the line 23—23 of Figure 16.

The form of apparatus shown in Figures 1 to 10 inclusive includes a substantially straight horizontal duct A in which are mounted a heat exchanger B, a fan C, and a liquid disperser unit generally designated D. The parts are so arranged that the fan C, located adjacent the right-hand end of the duct, as viewed in Figures 1 and 2, causes a stream of air to flow through the duct past the air chamber immediately above the disperser unit D, and over and through the heat exchanger B, the air then passing out through the left-hand end of the duct A. Before the air encounters the heat exchanger B, it is cooled by evaporative liquid thrown upwardly and dispersed or diffused by the disperser D so as more effectively to extract heat from the heat exchanger B. Preferably, the action of the disperser D is so regulated or controlled that, in addition to producing a volume of diffused liquid between the fan C and the heat exchanger B, it also deposits a very thin film of liquid upon the surfaces of the heat exchanger B so as to augment the cooling operation by evaporation of liquid from the heat exchanger.

The duct A may be of any suitable construction. In the form shown, it is constructed of sheet metal suitably reinforced at its seams and corners. Cushions or shock insulators 1 of rubber or similar cushioning material are attached to the top and bottom walls at the four corners of each for mounting either under a ceiling or on a floor, and preferably a screen 2 of wire mesh of equivalent reticulated material is mounted at the intake end of the duct for preventing the ingress of particles of solid foreign matter. Eliminators 3 are mounted at the left-hand or air discharge end of the duct for preventing the outflow of any unevaporated droplets of liquid which may be carried in the air stream past the heat exchanger B. The eliminators are so formed and inclined that droplets of liquid which they intercept will drain back into a pan or reservoir 4 mounted in the bottom of the duct A.

The fan C is driven by an electric motor 5 which is mounted upon a support comprising a platform 6 carried by legs 7 extending upwardly from the bottom of the pan 4. A partition 8 extending across the duct in the central plane of the fan C is formed with an opening 8ª which receives the fan blades with suitable operating clearance.

The heat exchanger B is shown as comprising a condenser tube or coil unit including an inlet connection 9 adapted to be connected to a source of gas or other fluid medium to be cooled, and to lead such medium to a top header 10. Extending from the top header 10 are four pipes 11 formed respectively as coils, and extending back and forth so as collectively to cover the major part of a cross section of the duct, the lower crosses of the pipes 11 ending at and being connected to a bottom header 12. Fluid cooled by passage through the pipes 11 flows from the bottom header 12 through a pipe 13 which extends diagonally across and toward the right-hand end of the duct, where it is connected to a horizontally disposed supplemental heat exchanger or cooling unit 14 which is located directly under the coil assembly 11 and just above the reservoir or tank 4 so as to underlie the part of the duct A included between the fan C and the heat exchange coil unit 11. The supplemental cooling unit 14 comprises an upper layer 14ª of pipe coils which extend generally toward the discharge end of the duct and then downwardly as at 14ᵇ for communication with a lower layer of coils 14ᶜ which extend toward the air-entrance end of the duct A and terminate in an exit pipe 15.

In operation, fluid to be condensed or cooled is introduced through the inlet 9 into the heat exchanger B so as to flow first through the coils 11 in which it is cooled by air forced through the duct A by the fan C. Under certain load conditions the cooling effect of the air alone may be sufficient to bring about the desired condensing or cooling of the fluid passed through the heat exchanger B.

Under heavier load conditions where a greater cooling effect is required, the disperser D is operated to create a mist or fog of dispersed or diffused evaporative liquid in the stream of air approaching the heat exchanger B, and so as to deposit a film of evaporative liquid on the coils 11. Evaporation of the liquid in the air stream cools the air itself so as to render its heat absorptive capacity greater; and evaporation of the film of liquid from the coils 11 still further augments the cooling capacity.

The surplus evaporative liquid, e. g. water, discharged by the disperser D and dropping, unevaporated, from the coil assembly 11, and from the duct space between the fan C and the coils 11, will envelop the supplemental cooler coils 14 and extract additional heat from the medium flowing from the coil unit 11 through the coils 14.

The overall capacity and operating efficiency of the apparatus depends very largely upon the effectiveness with which evaporative liquid is dispersed in the air stream and deposited in thin film form on the exchanger coils 11. In accordance with the present invention, the dispersing apparatus D, which performs this important function, is constructed as a compact unit which can be manufactured and assembled in unit form in a factory where the necessary care can be given to assembling the parts in their proper relationships. The unit so constructed and assembled may then easily be mounted within a duct A when the whole apparatus is set up or assembled either in an assembly plant or on a construction job location.

In its preferred form the dispersing unit D includes a base 16 adapted to be mounted upon a stand or bracket 16ª supported upon the bottom of the pan 4. The base 16 is formed at its opposite ends with spaced open-top receptacles 17 between which is mounted a liquid-tight motor housing 18, secured to the base by any suitable means, such as screws 19. An electric motor, generally designated 20, is mounted within the housing 18, and is secured to the housing bottom by screws 21. The motor itself includes an apertured casing 22 provided with bearings 22ª—22ª through which opposite ends of the motor shaft 23 extend so as to project through openings 24 in the end walls 25 and 25ª of the outer housing 18. The housing 18 is nearly filled with liquid dielectric, e. g., good quality insulating oil indicated at 26, in sufficient quantity to surround the motor 20 completely, and fill the motor casing. In order to prevent leakage of the dielectric from the housing 18, the openings 24 in the housing end walls are provided with suitable shaft seals 27 through which the shaft 23 extends. The motor conductors 28 extend from the motor housing 22 to connector posts 29 which project through the top of the housing 18 and have their outer or top ends buried in a cap of insulating compound 30 held in place by a dome-like cover 31. A sleeve 32 extending through the cover 31 provides for the passage of conductors connected to the outer ends of the posts 29.

In assembling the disperser unit, the right-hand end wall 25ª of the outer housing 18 is removed, the motor 20 is placed in the housing 18 and secured there by the screws 21, and the motor conductors 28 are connected to the inner ends of the connector posts 29. With the housing 18 positioned with its open end up, the liquid dielectric 26 is poured into the housing and the right-hand end wall 25ª is then secured in place. Preferably a sealing gasket 33 is interposed between the housing end and the end wall 25ª, which may be held in place by screws 34.

In operation, the dielectric oil fills the open or apertured motor casing 22 and covers the motor rotor and stator winding, circulating in and out of the motor casing to transfer the heat generated by the motor to the housing 18, and thence to the water in the reservoir 4.

The receptacles 17, previously referred to, are formed with side openings 35 which are so positioned as to be below the level of the liquid in the pan 4 when the dispersing unit D is mounted in the pan, as shown in Figure 1, thus ensuring that liquid from the pan 4 will flow into the receptacles 17 so as to maintain them filled to substantially the same level as the level of liquid in the pan 4. The evaporative liquid is picked up from the receptacles 17 and thrown transversely with respect to the direction of air flow, and also generally in the direction of air flow by impeller means comprising disks 36 mounted respectively on opposite ends of the shaft 23 and extending below the tops of the receptacles 17 so that the bottom portions of the disks will be partly submerged or immersed in liquid in the receptacles. The motor 20 drives the disks in the direction of the arrow $a$ in Figure 1 at such high speed as to throw the evaporative liquid vertically into the duct A, and also generally in the direction of flow of air, that is, from right to left as shown in Figure 1. An important feature of the invention is the particular construction of the disks, which are so formed as to produce an evenly diffused or dispersed fog or mist of evaporative fluid with a minimum of incidentally formed or thrown droplets of liquid of such size as not to be readily evaporated. The disks 36 are mutually balanced, and are of identical form. As shown in Figures 4, 5 and 7, each disk comprises a hub 37 secured to the associated motor shaft end by a set screws 38, a radially extending web portion 39, and a cylindrical, axially extending peripheral part 40. The part 40 is formed alternately with grooves 41 and ridges 42 which are deployed axially with respect to the motor shaft 23. Radial holes 43 extend from the inner surface of the part 40 to the bottoms or roots of the grooves 41.

In operation, when the disks are driven in the direction of the arrow $a$ (see Figs. 1 and 7), the portions of the disks passing through the liquid in the receptacle 17 will pick up liquid which will adhere to the outer and inner surfaces of the peripheral disk parts 40, the bottoms and radial walls of the grooves 41, and the walls of the radial holes 43. Portions of the disks with liquid adhering to these numerous surfaces will then turn through the air above the level of liquid in the receptacle 17 so as centrifugally to throw the liquid into the duct A. Liquid adhering to the outer surfaces of the peripheral parts 40 will be thrown off first so as to cause a dispersion or diffusion of liquid immediately to the left of the fan C. Liquid adhering to the wall parts of the radial holes 43 will work outwardly progressively until it reaches the outer surfaces of the peripheral part 40, and will then be hurled off centrifugally so as to create a diffused fog or mist more to the left of or down stream with respect to the fan C. Still later, liquid adhering to the cylindrical inner face part of the peripheral part 40 will find its way to the radial holes 43, and will then move outwardly through these holes so as to finally be thrown centrifugally in the direction of air flow in dispersed or diffused form, and will be deposited upon the coils 11 of the heat exchanger B in the form of thin films which will be evaporated in the manner previously described. Although liquid picked up by the disks 36 is thus thrown off generally in three-time phases, in the practical operation of the apparatus, there is no sharp line of demarcation between any of the successive phases. Instead, there is a gradual merging or transition from one phase to the other so that in effect there is a continuous or steady throwing off of liquid throughout substantially the whole travel of the unsubmerged parts of the disks.

It is desirable to control or regulate the zone within which the liquid dispersion or diffusion is produced, particularly in order to prevent throwing of liquid directly against the fan C instead of into the air stream on the down-stream side of the fan. In accordance with the invention, such control may be accomplished through the provision of adjustable deflector means comprising arcuate deflector bands or strips generally designated 44. As shown particularly in Figure 7, each deflector disk extends arcuately and concentrically with respect to the axis of rotation of its associated dispersing disk 36, and has a part 44ª projecting above the associated pan 17. The remaining part of the deflector 44 extends down into the pan and below the disk 36 where it is supported on an arcuate guide 45, and is held in place by screws 46 extending through guide slots 47. The heads of the screws 46 are adapted to be screwed against the guide 45 adjacent the walls of the slot 47 so as to lock the deflector 44 in adjusted position. Preferably, the deflector 44 is channel-shaped in cross section and, as shown in Figure 9, comprises a web part 48 and inwardly extending side flanges 49.

The deflector 44 is so positioned with respect to the associated disk 36 that its portion 44ª extending above the pan 17 enshrouds the periphery of the disk 36 immediately above the point at which the disk leaves or emerges from the liquid in the receptacle 17. Accordingly, liquid which otherwise would be thrown centrifugally toward the air-entrance end of the duct A, is intercepted or blocked by the deflector part 44ª, thus confining the diffusion space or zone to the down-stream side of the fan C.

Figure 10:
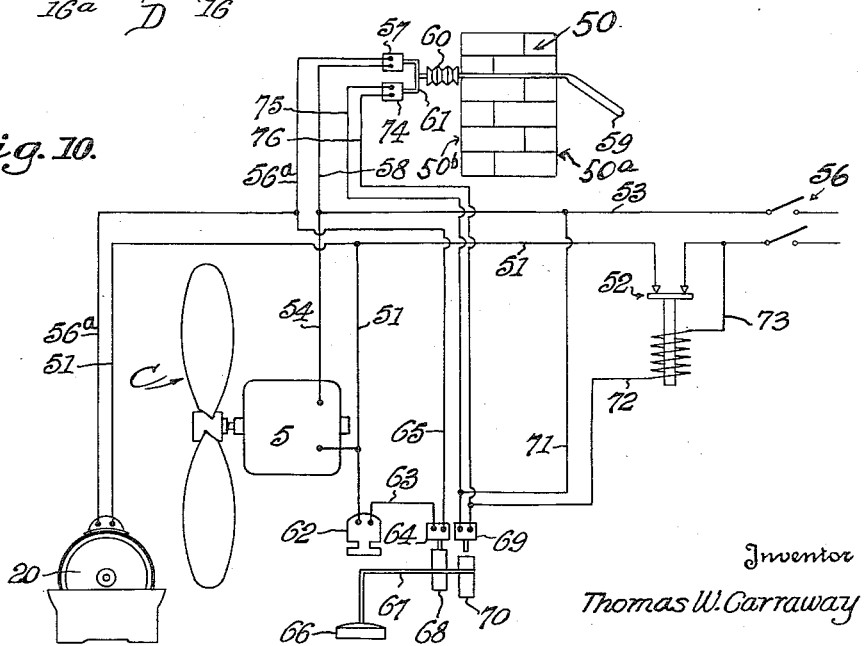
Figure 10 is a wiring diagram showing a control circuit and control devices for regulating the operation of the apparatus.

Improved equipment is provided for controlling the operation of the fan motor 5, and the disperser motor 20, and the supplying of evaporative liquid to the tank or reservoir 4, all in dependence upon atmospheric conditions. Figure 10 shows schematically a control arrangement particularly suited for use in localities in which there is a wide range of outside air temperatures, that is, in localities in which the summer temperature is high enough to make it necessary to disperse evaporative fluid in the duct A for efficient operation, and in which in winter the temperature is below freezing or is low enough to product a sufficient cooling effect without its being necessary for the disperser to operate.

Figure 10 shows a part of a building wall 50, the inner surface 50ᵇ of which faces a room or an enclosure housing the apparatus disclosed in Figures 1–9 inclusive, and the outside surface 50ª of which is exposed to outside air temperatures. One conductor 51 of an electrical power line leads through a normally closed relay or solenoid-operated switch 52 to one side of each of the motors 5 and 20 which operate the fan C and the disperser unit D respectively. The other conductor 53 of the power line leads through a conductor 54 to the other side of the fan motor 5. A main control switch generally designated 56 is interposed in the power line. When this switch is closed the fan motor 5 will operate continuously irrespective of atmospheric temperatures outside of the building.

The disperser motor 20 will operate only when the outside temperature is sufficiently high to require the dispersing or evaporative fluid in the duct A to produce the desired cooling effect. In most localities this condition will obtain throughout most of the year and may therefore be considered the normal operating condition. In order that the disperser motor 20 may be stopped when the outside air temperature reaches a predetermined low point and may automatically be started when the outside temperature rises above that point, a conductor $56^a$ is led from the motor 20 to a normally closed micro-switch 57, and a conductor 58 is led from the switch 57 to the power line conductor 53. A thermostat, comprising a bulb or container 59 for expansible gas located outside the wall 50 and sylphon bellows 60 on the inside of the wall, is provided for pressing upon an operating arm or bar 61 and maintaining the switch 57 closed when the outside air temperature is above the predetermined point.

In operation under normal conditions the expansible gas in the thermostat device 59–60 being heated above the predetermined outside temperature will expand the bellows 60 so as to maintain the switch 57 closed. Under these conditions a circuit will be completed through the power line conductor 51, the switch 52, the motor 20, the conductor 56ª, the closed micro-switch 57, the conductor 58, and the power line conductor 53 so that the disperser motor 20 will operate. If, however, the outside temperature should fall below the predetermined point, the gas in the thermostatic device 59—60 will contract, the bellows 60 will collapse, and the micro-switch 57 will open so as to break the disperser motor circuit, the fan motor 5, however continuing in operation.

Means is provided for automatically effecting the addition of water to the tank or reservoir 4 in order to maintain a substantially predetermined level therein. In the embodiment of the invention shown in Figures 1 to 10 inclusive, a solenoid-operated valve 62 is positioned to discharge make-up evaporative fluid into the tank 4. The circuit for operating the solenoid valve 62 includes the conductor 51 leading from the power line to one side of the solenoid, a conductor 63 leading from the other side of the solenoid to a normally open micro-switch 64, a conductor 65 leading from the micro-switch 64 to the conductor 56ª, the normally closed micro-switch 57, and the conductor 58 which leads to the conductor 53 of the power line. When the liquid in the tank 4 is at a predetermined operating level, the micro-switch 64 will remain open so that the valve 62 will not be opened to discharge make-up liquid into the tank. When liquid is lost or consumed in the cooling operation the level in the tank 4 will fail, permitting lowering of a float 66 and rocking of a shaft 67 and a cam 68 which causes the switch 64 to be closed. This will energize the solenoid, causing the valve 62 to open and discharge make-up liquid into the tank 4 until rising of the float 66 returns the cam 68 to its normal position in which the micro-switch 64 will be opened so as to de-energize the solenoid and close the make-up valve 62.

When the apparatus is operating under normal conditions, that is, when the outside temperature calls for operation of the disperser unit D, it is desirable that the entire apparatus be placed out of operation or that a warning signal be operated in the event that the supply of evaporative liquid fails. To this end a normally closed micro-switch 69 adapted to be opened by a cam 70 on the float rock shaft 67 is provided for controlling the normally closed relay or switch 52 previously referred to. As shown in Figure 10, a conductor 71 leads from the power line conductor 53 through the normally closed control switch 69, a conductor 72, the coil of the relay 52, and a conductor 73 to the power line conductor 51. If the liquid in the tank 4 should fall below a predetermined level, the lowering of the float 66 and rocking of the cam 70 will open the micro-switch 69 so as to de-energize the relay coil 52 and automatically open the entire circuit. The opening of the switch 52 in itself provides a signal or indication that the supply of evaporative fluid has failed. However, if desired, a bell, signal lamp, or the like could be arranged to operate at a remote observation point to indicate the failure of the liquid supply.

When the apparatus is operating under cold weather conditions not calling for the running of the disperser motor 20, the normally closed micro-switch 57 in circuit with the solenoid valve 62 will be open and therefore the valve will not be operated automatically to supply make-up liquid to the tank 4 to take the place of liquid which is lost by surface evaporation caused by the relatively high temperature in the room or enclosure in which the apparatus is located. Consequently, after the apparatus has been in operation under such conditions for a short while, the float 66 will descend, causing the micro-switch 69 to be opened in the manner described above. In order that the opening of the switch 69 under these conditions will not stop the operation of the whole system, which would be undesirable, a normally open micro-switch 74 is shunted across the micro-switch 69 by means of conductors 75 and 76. Under cold weather conditions the contraction of the bellows 60 and operation of the arm 61 causes the control switch 74 to close, thereby maintaining the coil of the relay switch 52 energized irrespective of whether the float-controlled switch 69 is open or closed. Thus, when the switch 74 is open, the switch 69 is conditioned for operation by the float 66 to de-energize the relay coil 52, but when the switch 74 is closed, the switch 69 is not conditioned for effective operation.

Figure 10 shows the control equipment only schematically and it is not intended to disclose or claim the specific construction of the control devices in this application. However, reference may be had to the patent to Thomas W. Carraway, No. 2,631,829, dated March 17, 1953, for a disclosure of a pair of float-operated micro-switches which could, for example, be used for performing the functions of the switches 64 and 69 shown schematically in Figure 10 of the present application.

The form of apparatus embodying the invention illustrated in Figures 11 to 23 inclusive comprises a substantially straight horizontal duct 100A in which are mounted a heat exchanger 100B, a fan 100C, and a liquid disperser unit generally designated 100D. The parts are so arranged that the fan 100C, located adjacent the right hand end of the duct as viewed Figures 11 and 12, causes a stream of air to flow through the duct past the air chamber immediately above the disperser unit 100D, and over and through the heat exchanger 100B, the air then passing out through the left hand end of the duct 100A. Before the air encounters the heat exchanger 100B, it is cooled by evaporative liquid thrown upwardly and dispersed or diffused by the disperser 100D so as more effectively to extract heat from the heat exchanger 100B. Preferably, the action of the disperser 100D is so regulated or controlled that, in addition to producing a volume of diffused liquid between the fan 100C and the heat exchanger 100B, it also deposits a very thin film of liquid upon the surfaces of the heat exchanger 100B so as to augment the cooling operation by evaporation of liquid from the heat exchanger. Additionally, relatively large drops or globules of evaporative liquid are caused constantly to impinge upon the upper part of the heat exchanger 100B from which they run down over the intermediate and lower parts of the heat exchanger so as to maintain the heat exchanger constantly washed and free from scale and foreign matter which otherwise would interfere with the efficient transferring of heat.

The duct 100A may be of any suitable construction, and in the form shown in Figures 11 to 23 it is constructed of sheet metal suitably reinforced at its seams and corners. A screen 102 of wire mesh or equivalent material is mounted at the intake end of the duct for preventing the entrance of particles of solid foreign matter. A mat or filter 103 of fibrous material is mounted at the left hand end of the duct for preventing the outflow of any unevaporated droplets of liquid which may be carried in the air stream past the heat exchanger 100B. The filter or mat 103 is so positioned that droplets of liquid which it intercepts will drain back into a pan or reservoir 104 mounted in the bottom of the duct 100A.

The fan 100C is arranged to be driven by an electric motor 105 mounted upon a support comprising a platform 106 carried by legs 107 extending upwardly from the bottom of the pan 104. A partition 108 extending across the duct in the central plane of the fan 100C is formed with an opening 108ª which receives the fan blades with suitable operating clearance.

The heat exchanger 100B comprises a condenser tube or coil unit having an inlet connection 109 adatped to be connected to a source of gas or other fluid medium to be cooled and to lead such medium to a top header 110 which may be constituted by the left end of the pipe or connection 109. Extending from the top header 110 are ten pipes 111 formed respectively as coils, the pipes 111 extending back and forth so as collectively to cover the major part of a cross section of the duct 100A, the lower parts of the pipe 111 ending at and being connected to a bottom header 112. Fluid cooled by passage through the pipes 111 flows from the bottom header 112 through a pipe bend 113 (Figure 13) into a horizontally disposed supplemental heat exchanger or cooling unit 114 which is located directly under the coil assembly 111. Fluid which has been cooled in the pipe coils 111 and the supplemental heat exchanger 114 is discharged through an exit pipe 115.

In operation, fluid to be condensed or cooled is introduced through the inlet 109 into the heat exchanger 100B so as to flow first through the coils 111 in which it is cooled by air forced through the duct 100A by the fan 100C. Under certain load conditions the cooling effect of the air alone may be sufficient to bring about the desired condensing or cooling of the fluid passed through the heat exchanger 100B.

Under heavier load conditions, when a greater cooling effect is desired, the disperser 100D is operated to create a mist or fog of dispersed or diffused evaporative liquid in the stream of air approaching the heat exchanger 100B, and so as to deposit a film of evaporative liquid on the coils 111, and to cause relatively large drops of liquid to impinge upon the top part of the coils 111 so as to maintain the entire heat exchanger 100B washed. Evaporation of the liquid in the air stream cools the air itself so as to render its heat absorptive capacity greater; and evaporation of the film of liquid from the coils 111 still further augments the cooling capacity.

The surplus evaporative liquid e. g. water, discharged by the disperser 100D and dropping, unevaporated, from the coil assembly 111, and from the duct space in which the coil assembly 111 is mounted, will envelop the supplemental cooler 114 and extract additional heat from the medium flowing from the coil unit 111 through the supplemental unit 114.

The dispersing apparatus 100D which performs the important function of creating a graduated dispersion of liquid varying progressively from relatively large drops cast upon the upper part of the unit 100B to a finely diffused fog or mist caused to envelop the intermediate and lower parts of the coil assembly, is constructed as a unit which can be manufactured and assembled in a factory where the necessary care can be given to assembling the parts in their proper relationship. The unit 100D can then be easily mounted within the duct 100A when the whole apparatus is set up or assembled either in an assembly plant or on a construction job location.

The dispersing unit 100D includes a base structure generally designated 116 mounted upon a stand or bracket comprising channel supports 116ª (Figure 14) secured in any suitable manner to the bottom of the pan 104. The base structure includes two open top receptacles 117 respectively connected to an intervening motor housing 118 by screws 119. A motor 120 is mounted within the housing 118 and has its shaft 121 journalled in motor bearings 122 and projecting through bearings 123 fitted in openings 124 in the end walls 125 of the housing 118. The weight of the motor is carried by its shaft 121, supported in the bearings 123. Rotation of the motor stator is prevented by engagement of motor stator clamping screws 125ª in tapered slots 125ᵇ in lugs 125ᶜ on the upper and lower halves 118ª and 118ᵇ of the housing 118.

The housing 118 is filled, or nearly filled with liquid dielectric, e. g., good quality insulating oil indicated at 126 in sufficient quantity to surround the motor 120 completely, and substantially fill the motor casing, having ingress thereto through a hole 127 through which wires extend outwardly from the motor windings, and other holes (not shown) with which the motor casing may be provided. The wires or conductors 128 leading from the motor windings outwardly through the hole 127 into the housing 118 pass outwardly through the housing through a fitting 129 at the lower end of a tube 130 which may be constituted by a flexible hose, the upper end of which extends into a junction or control box 131 as shown in Figure 12. Also leading into the junction or control box 131 is a power supply cable 132 and a conductor cable 132ª which extends to the fan motor 105.

The outer housing 118 is constituted by an upper half section 118ª and a lower half section 118ᵇ connected together by bolts 118ᶜ. In assembling the disperser unit 100D, the upper section 118ª is removed, the motor 120, the bearings 123 and seals 123ª are inserted into the lower section 118ᵇ, and the conductors 128 are led outwardly through the fitting 129 and the hose 130. Then the upper section 118ª is bolted down on the lower section 118ᵇ. If desired, the separate motor casing may be omitted, in which case the motor field coils may be mounted directly on the housing 118, and the armature supported by its shaft extending through the bearings 123 carried by the housing 118. The dielectric 126 may be introduced into the housing through the opening therein which receives the fitting 129, or, with the upper end of the hose 130 positioned at a level substantially above that of the housing 118, liquid dielectric may be poured down through the hose 130 so as to fill the housing 118 and to extend partially upwardly through the hose 130, the upper level of the dielectric standing in the hose 130 being below the upper end of the hose.

In operation, the dielectric oil fills the casing of the motor 120 and surrounds and covers the motor rotor and stator windings, so as to transfer the heat generated by the motor to the dielectric 126 included in the space between the motor casing and the housing 118. Although this provides for very efficient cooling of the motor, continued operation under even reasonably heavy load conditions necessarily will result in some temperature rise in the motor and in the dielectric oil 126, causing the latter to expand somewhat. Expansion of the oil can take place without creating pressure in the housing 118, since the oil may rise slightly within the hose 130. Conversely, when the motor cools, the consequent cooling and contraction of the dielectric 126 will not produce any vacuum within the housing 118, because when the dielectric cools and contracts it will be replenished by oil descending from the hose 130.

The receptacles 117 are formed with side openings 135 so positioned as to be below the level of the evaporative liquid in the pan 104 when the dispersing unit 100D is mounted in the pan as shown in Figure 12, thus ensuring that liquid from the pan 104 will flow into the receptacles 117 so as to maintain them filled to substantially the same level as the level of the evaporative liquid in the pan. The evaporative liquid is picked up from the receptacles 117 and thrown transversely with respect to the direction of air flow, and also generally in the direction of air flow by impeller means comprising disks 136 mounted respectively on the opposite ends of the shaft 121 and extending below the tops of the receptacles 117, so that the bottom portions of the disks will be partly submerged or immersed in evaporative liquid in the receptacles. The motor 120 drives the disks in the direction of the arrow a in Figure 12 at such high speed as to throw the evaporative liquid vertically into the duct 100A, and also generally in the direction of flow of air, that is, from right to left as shown in Figure 12. The disks 136 are so formed as to produce a graduated dispersion of drops, and fog or mist of evaporative fluid with some droplets of such size as not to be immediately evaporated. A sufficient quantity of droplets of unevaporated liquid is thrown against the upper part of the heat exchanger unit 100B to insure that liquid draining down over the coils in the unit 100B will maintain the coils thoroughly washed and free of adhering solid impurities and scale.

Preferably, the disks 136 are mutually balanced and are of identical form. Each disk comprises a hub 137 secured to the motor shaft 121 by a set screw 138, a radially extending web portion 139, and a cylindrical, axially extending peripheral part 140. The part 140 is formed alternately with grooves 141 and ridges 142 which are deployed axially with respect to the motor shaft 121. Radial holes 143 extend from the inner surface of the part 140 to the bottoms or roots of the grooves 141.

In operation, when the disks are driven in the direction of the arrow $a$ in Figure 12, the portions of the disks passing through the liquid in the receptacles 117 will pick up liquid which will adhere to the outer and inner surfaces of the peripheral disk parts 140, the bottoms and radial walls of the grooves, and the walls of the radial holes 143. Portions of the disks with liquid adhering to these numerous surfaces will then turn through the air above the level of liquid in the receptacles 117 so as to throw the liquid centrifugally into the duct 100A. Liquid adhering to the outer surfaces of the peripheral parts 140 will be thrown off first so as to cause a dispersion or diffusion of liquid immediately to the left of the fan 100C. Liquid adhering to the wall parts of the radial holes 143 will work outwardly progressively until it reaches the outer surfaces of the peripheral part 140, and will then be hurled off centrifugally so as to create a diffused fog or mist more to the left of or downstream with respect to the fan 100C. Still later, liquid adhering to the cylindrical inner face part of the peripheral part 140 will find its way to the radial holes 143, and will then move outwardly through these holes so as finally to be thrown centrifugally in the direction of air flow in dispersed or diffused form. The diffused liquid will then be deposited upon the coils 111 of the heat exchanger 100B in the form of thin films which will be evaporated in the manner previously described. Although liquid picked up by the disks 136 is thrown off generally in three time phases, in the practical operation of the apparatus, there is no sharp line of demarcation between any of the successive phases. Instead there is a gradual merging or transition from one phase to the other so that, in effect, there is a continuous or steady throwing off of liquid throughout substantially the whole travel of the unsubmerged parts of the disks.

In order to control the zone within which the liquid dispersion or diffusion is produced, particularly in order to prevent throwing of liquid directly against the fan 100C instead of into the air stream on the downstream side of the fan, the bottom of each receptacle 117 is formed to serve also as a deflector 144 having a lip 145 adjacent the portion of the associated disk which is running out of the receptacle 117, the lip projecting slightly above that portion of the disk. The lip is so positioned with respect to the associated disk 136 as to permit evaporative liquid to be thrown upwardly and downstream at an inclination toward the upper part of the heat exchanger 100B without permitting liquid to be thrown directly upwardly against the top of the duct or against the fan. The bottom of each receptacle 117 may also be formed with a lip 146 located adjacent the downgoing side of the associated disk for deflecting evaporative liquid thrown off by the disk into the receptacle 117 instead of permitting the liquid to be thrown onto the surface of liquid in the pan 104. Generally stated, the deflectors 144 act similarly to the deflectors 44 described with reference to the construction shown in Figures 1 to 10 except that the deflectors 144 are not adjustable. In some instances it is advantageous to be able to adjust the deflectors 44, but in most cases it is advisable to have the deflectors set or built in the most advantageous position with respect to the disperser disks at the factory, and not to provide any means for adjustment which may be tampered with by one inexperienced in the adjustment of such equipment.

A particular feature of the construction shown in Figures 11 to 23 is the provision of a plurality of vanes 147 secured to the underside of the top of the duct 100A for spreading the diffused evaporative liquid laterally over the heat exchanger unit 100B. As shown in Figures 13 and 15, the vanes are so positioned that evaporative liquid thrown off by the disks 136 will be deflected outwardly towards the sides of the duct 100A, ensuring that the side portions of the pipe coils 111 will not be "starved" for cooling and washing. The liquid thrown off by the two disks 136 spreads laterally to some extent of its own accord but is more concentrated directly in front of the disks than to the sides thereof. The overlapping paths of liquid thrown off by the two disks at the center of the duct 100A combine to provide sufficient liquid for washing and cooling the portions of the coils 111 of the center of the duct to approximately the same extent as the coil portions directly in front of the disks 136. Consequently, the vanes 147 are so positioned as not to deflect liquid inwardly toward the center of the duct. It is important, however, that the vanes diverge so as to guide or deflect the liquid laterally outwardly to provide ample liquid adjacent the sides of the duct 100A. The vanes also direct washing liquid toward the outlet end of the duct 100A to ensure drainage of liquid over the coils 111 between the rightmost coil, as viewed in Figures 11 and 12, and the coil adjacent the filter or eliminator 103, thus ensuring that all of the coil elements will be kept washed clean.

The apparatus disclosed in Figures 11 to 23 inclusive may be provided with control means of the kind illustrated in Figure 10. The control equipment may be modified to suit conditions or manufacturing costs. For example, there may be provided a float 166 for directly operating a float controlled make-up valve 166$^a$ for controlling the admission of evaporative liquid from a supply line 166$^b$ to maintain the liquid at the proper level in the pan 104.

The construction shown in Figures 11 to 23 also includes means for ensuring against the overflowing of the pan 104 if the float valve should fail properly to cut off the supply through the pipe 166$^b$, and also to keep the surface of the liquid in the pan 104 free of buoyant debris. As shown in Figure 12, a drain pipe 167 is equipped with a funnel-shaped skimmer 168 having an open upper end of substantial area in a horizontal plane and at a level about one-eighth inch above the normal liquid level maintained in the pan 104 by the float valve 166$^a$. The arrangement is such that some of the water thrown off by the disperser unit will rain into the skimmer, and will be drained off, carrying with it buoyant debris. If the float valve should fail to close, the skimmer would drain off surplus liquid, and prevent overflowing in the pan 104. By unscrewing the skimmer 168, the pan may be drained. Normally, the skimmer drains off only the liquid which falls into it from the diffused liquid thrown off by the disperser unit, and unnecessary wasting of liquid is prevented. However, the normal removal of liquid through the skimmer is sufficient to maintain the liquid in the system substantially free from buoyant debris.

The constructions illustrated embody the invention in preferred forms, but it is intended that the disclosure be illustrative rather than definitive. The invention is defined in the appended claims.

I claim:

1. In a liquid dispersing unit, an open-top liquid receptacle; a disk mounted to rotate about a horizontal axis extending across said receptacle, a lower portion only of said disk extending down into said receptacle for immersion in liquid therein, said disk comprising a radially extending portion, and a perforated cylindrical peripheral portion extending axially from said radially extending portion and defining a cylindrical chamber open at one end to permit entrance of liquid freely within said cylindrical peripheral portion, said cylindrical portion being formed with alternately arranged, axially deployed grooves and ridges.

2. In a liquid dispersing unit, an open-top liquid receptacle; a disk mounted to rotate about a horizontal axis extending across said receptacle, a lower portion only of said disk extending down into said receptacle for immersion in liquid therein, said disk comprising a radially extending portion, and a cylindrical peripheral portion extending axially from said radially extending portion, said cylindrical portion being formed with alternately arranged, axially deployed grooves and ridges, and with openings extending radially through said cylindrical portion from the bottoms of said grooves to the inside of said cylindrical portion.

3. In evaporative condenser apparatus, an air duct; a heat exchanger mounted in said duct and extending transversely and vertically therein; means for causing a stream of air to flow through said duct and in contact with and past said heat exchanger; an open top liquid reservoir means in said duct positioned upstream with respect to the direction of air flow; a disperser disk mounted to rotate about a horizontal axis extending across said reservoir, a lower portion only of said disk extending downwardly into said reservoir for immersion in liquid therein, said disk having a radially extending portion and a cylindrical peripheral portion extending axially from said radially extending portion, said peripheral portion being formed with alternately arranged circumferential grooves and ridges adapted, when said disk is rotated at high speed, to throw off liquid in successive but merging phases so as to produce within said duct a liquid distribution varying progressively across said duct from a dispersion of relatively large drops which are thrown against the upper part of said heat exchanger to a finely diffused fog or mist which is caused to envelop the lower part of said heat exchanger whereby substantially the entire heat exchanger will be maintained wet and liquid from said drops will run down and over and thereby will wash the surfaces of said heat exchanger from top to bottom thereof; and a motor for driving said disk at a speed sufficiently high to produce the so characterized liquid distribution.

4. In evaporative condenser apparatus, an air duct; a heat exchanger mounted in said duct and extending transversely and vertically therein; means for causing a stream of air to flow through said duct and in contact with and past said heat exchanger; an open top liquid reservoir means in said duct positioned upstream with respect to the direction of air flow; a disperser disk mounted to rotate about a horizontal axis extending across said reservoir, a lower portion only of said disk extending downwardly into said reservoir for immersion in liquid therein, said disk having a radially extending portion and a cylindrical peripheral portion extending axially from said radially extending portion, said peripheral portion being formed with a plurality of circumferentially and axially deployed openings extending through said peripheral portion, whereby said disk is adapted when rotated at high speed, to throw off liquid in successive but merging phases so as to produce within said duct a liquid distribution varying progressively across said duct from a dispersion of relatively large drops which are thrown against the upper part of said heat exchanger to a finely diffused fog or mist which is caused to envelop the lower part of said heat exchanger whereby substantially the entire heat exchanger will be maintained wet and liquid from said drops will run down and over and thereby will wash the surfaces of said heat exchanger from top to bottom thereof; and a motor for driving said disk at a speed sufficiently high to produce the so characterized liquid distribution.

References Cited in the file of this patent

UNITED STATES PATENTS

| 1,269,909 | Cooper | June 19, 1918 |
| 1,667,291 | Lavett | Apr. 24, 1928 |
| 2,064,271 | Schmidt et al. | Dec. 15, 1936 |
| 2,091,159 | Persons | Aug. 24, 1937 |
| 2,215,753 | Goodman et al. | Sept. 24, 1940 |
| 2,448,297 | Christensen | Aug. 31, 1948 |
| 2,571,069 | Shearman | Oct. 9, 1951 |